(12) United States Patent
Daumueller et al.

(10) Patent No.: US 6,231,222 B1
(45) Date of Patent: May 15, 2001

(54) HEADLIGHT FOR VEHICLE

(75) Inventors: Hans Daumueller, Bodelshausen; Rolf Klaiber, Reutlingen; Olaf Rottstaedt, Tabarz; Horst Oschmann, Struth-Helmershof; Peter Jung, Trusetal, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/300,616

(22) Filed: Apr. 27, 1999

(30) Foreign Application Priority Data

Jun. 26, 1998 (DE) .......................................... 298 11 440 U

(51) Int. Cl.[7] ........................................................ F21V 19/02
(52) U.S. Cl. ...................... 362/524; 362/523; 362/532; 362/531; 362/528
(58) Field of Search ...................... 362/524, 514, 362/515, 516, 523, 528, 531, 532, 288, 278, 306, 464

(56) References Cited

U.S. PATENT DOCUMENTS 4,210,033 * 7/1980 Erikson et al. ................. 74/424.8 A
5,309,780 * 5/1994 Schmitt .............................. 362/524
6,017,136 * 1/2000 Burton .............................. 362/514

* cited by examiner

Primary Examiner—Thomas M. Sember
Assistant Examiner—David V. Hobden
(74) Attorney, Agent, or Firm—Michael J. Striker

(57) ABSTRACT

A headlight for a vehicle has a holder, at least one reflector displaceably supported on the holder, an adjusting device for displacing the reflector and including an adjusting screw having a thread and a displaceably guided transmission element which is articulately connected with the reflector and with the adjusting screw so that during turning of the adjusting screw the transmission element is displaced in a longitudinal direction to displace reflector. The transmission element disengages from the thread of the adjusting screw in the longitudinal direction after the transmission element has reached a predetermined maximum longitudinal displacement, but after a smaller displacement it abutts against at least one abutment, so that during a further movement of the transmission element until the transmission element disengages from the thread of the adjusting screw, a return force is produced which loads the transmission element in an opposite longitudinal displacement direction.

12 Claims, 4 Drawing Sheets

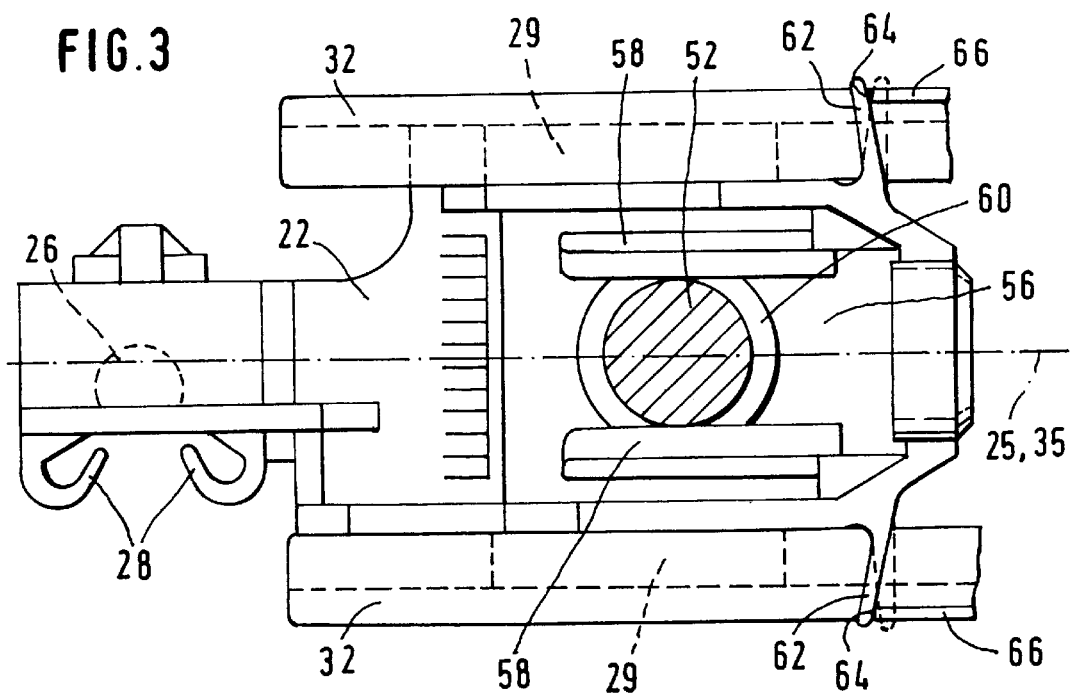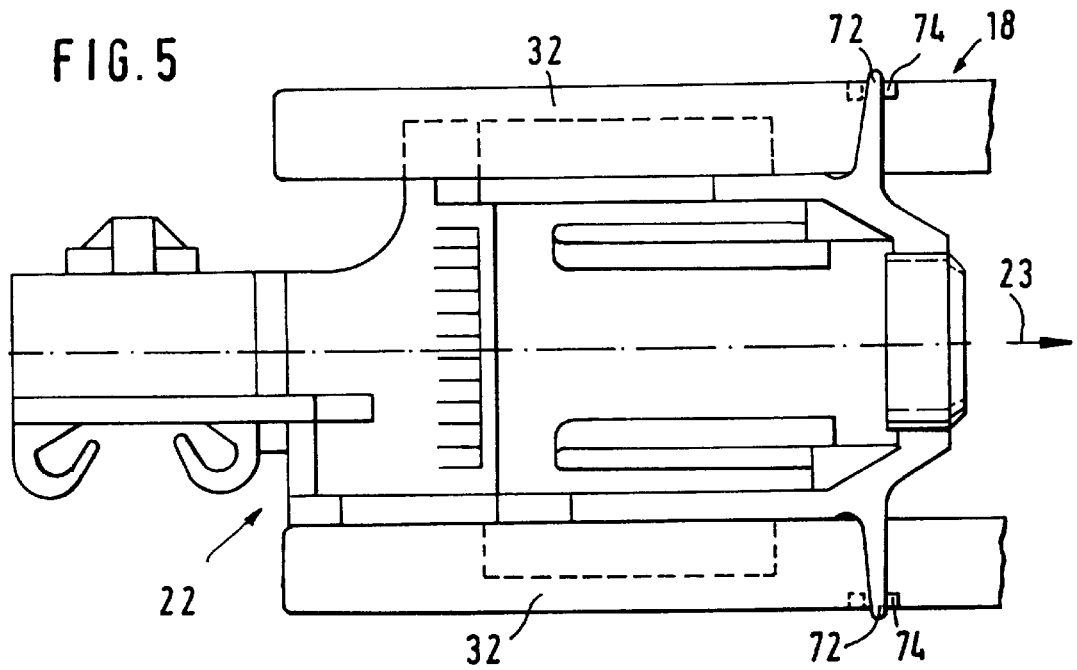

HEADLIGHT FOR VEHICLE

BACKGROUND OF THE INVENTION

The present invention relates to a headlight for vehicles.

One of such headlights is disclosed for example in the German patent document DE 38 14 289 A1. The headlight has a holder in form of a housing, on which a reflector is adjustably supported. For adjusting the reflector, an adjusting device is provided which has an adjusting screw connectable by a thread with a transmission element which is articulately connected with the reflector. The adjusting screw is supported rotatably about its longitudinal axis. During its rotation, the transmission element due to the thread moves in a longitudinal direction along the longitudinal axis of the adjusting screw and adjusts the reflector. For preventing movement of the reflector relative to the holder or similar components of the headlight, the moving possibility of the transmission element in the longitudinal direction must be limited. In a known headlight, the adjusting screw is turned in one direction so that the transmission element can disengage the thread of the adjusting screw and then no adjustment of the reflector is possible any longer. During turning of the adjusting screw in the other direction, the transmission element comes to abutment against the holder, while during a further turning of the adjusting screw, the transmission element or the adjusting screw can be damaged.

SUMMARY OF THE INVENTION

Accordingly, it is an object of the present invention to provide a headlight for a vehicle, which avoids the disadvantages of the prior art.

In keeping with these objects and with others which will become apparent hereinafter, one feature of present invention resides, briefly stated, in a headlight, in which the transmission element for limiting of its displacement path in at least one displacement direction, after a predetermined maximum displacement disengages the thread of the adjusting screw, the transmission element after a certain displacement path after a maximum displacement in the displacing direction comes to abutment against at least one abutment, and during a further movement of the transmission element in the transmission direction until the transmission element disengages from the thread of the adjusting screw a return force is produced which acts on the transmission element in an opposite displacement direction.

When the headlight is designed in accordance with the present invention, it has the advantage that the adjusting screw can be turned arbitrarily. Since the transmission element disengages the thread of the adjusting screw, a damage to these parts is prevented. Due to the available return force the transmission element again engages with the thread of the adjusting screw for a subsequent longitudinal movement of the transmission element in another longitudinal direction.

In accordance with another feature of the present invention, the abutment of the transmission element can be (should be springy) springy deformable, the abutment is springy deformed until reaching of the maximum displacement path of the transmission element, and it produces a return force which acts on the transmission element in the opposite displacement direction.

It is also possible that the transmission element is provided with a springy deformable portion which comes to abutment against an abutment, and during reaching the maximum displacing path of the transmission element is springly deformed, and it produces a return force which acts on the transmission element in the opposite displacement direction.

With such a construction, the return force for the transmission element can be produced in a simple way.

In accordance with still a further feature of the present invention, the abutment can be formed as a springy element which is arranged between the transmission element and the holder or the adjusting screw, and during reaching of the maximum displacement path of the transmission element it is springy deformed, and produces the return force which acts on the transmission element in the opposite adjusting direction.

In this construction obtaining of the return force does not need a special construction of the transmission element and/or holder.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing the adjusting device in a horizontal longitudinal section taken along the line III—III in FIG. 2;

FIG. 5 is a view showing the horizontal longitudinal section of the adjusting device in accordance with the second embodiment of the present invention;

DESCRIPTION OF PREFERRED EMBODIMENTS

Figure 1:
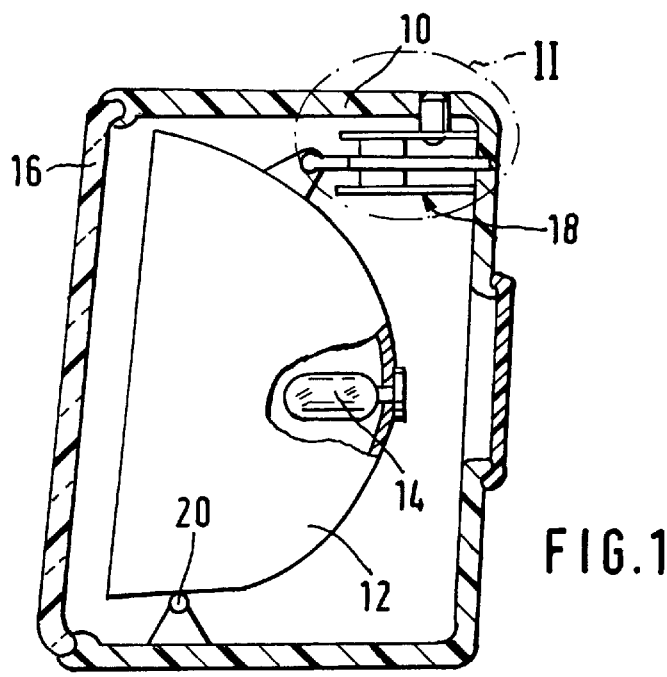
FIG. 1 is a view showing a headlight in a simplified illustration, in a vertical longitudinal section.

A headlight for a vehicle shown in FIGS. 1–7, in particular for a motor vehicle, has a holder 10, which is formed for example as a housing. At least one reflector 12 is arranged in the housing 10, and a light source 14 is inserted in the reflector. The light outlet opening of the housing 10 is covered with a light-permeable disk 16. The reflector 12 is supported by several bearing points in the housing 10 and is adjustable relative to the housing 10 to make possible an adjustment of the direction of the light bundle which is reflected by the reflector 12. An adjusting device 18 is provided on at least one bearing point so as to adjust the reflector 10 relative to the housing 10. Preferably, the reflector 12 is supported turnably about a horizontally extending axis 20 and/or a vertically extending axis. The adjusting device 18 engages the reflector 12 eccentrically to the axis. In the embodiment of FIG. 1, the reflector 12 is turnable about a horizontal axis 20 which extends near its lower edge, and the adjusting device 18 engages the reflector 12 near the upper edge.

Figure 2:
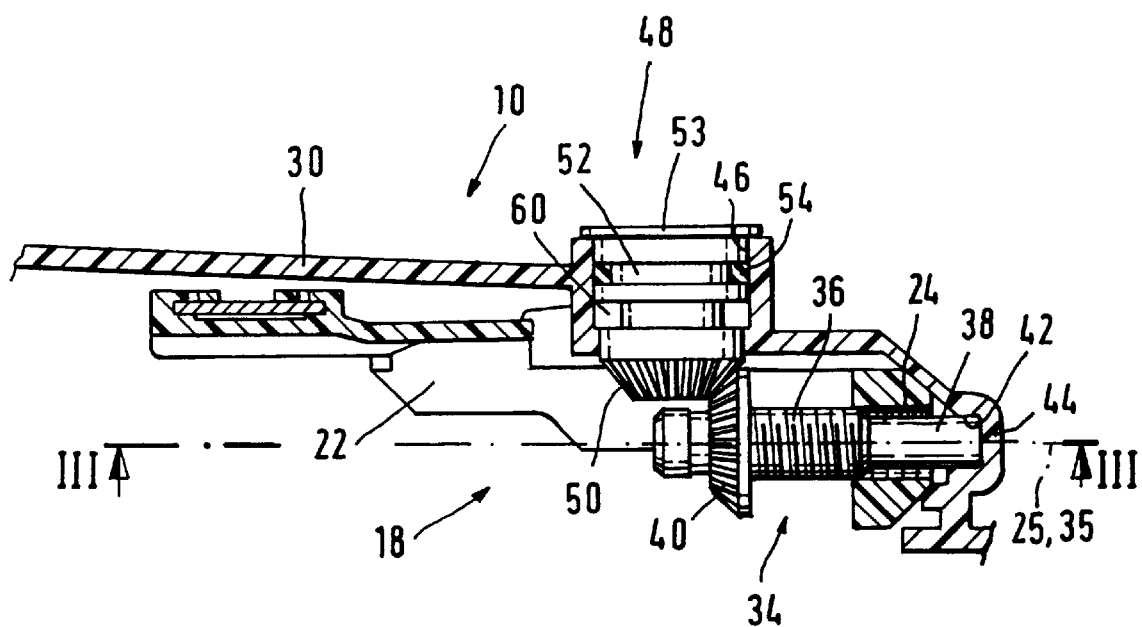
FIG. 2 is a view showing a portion of a headlight identified with reference numeral 11 in FIG. 1, with an adjusting device in accordance with a first embodiment of the present invention, on an enlarged scale.
Figure 4:
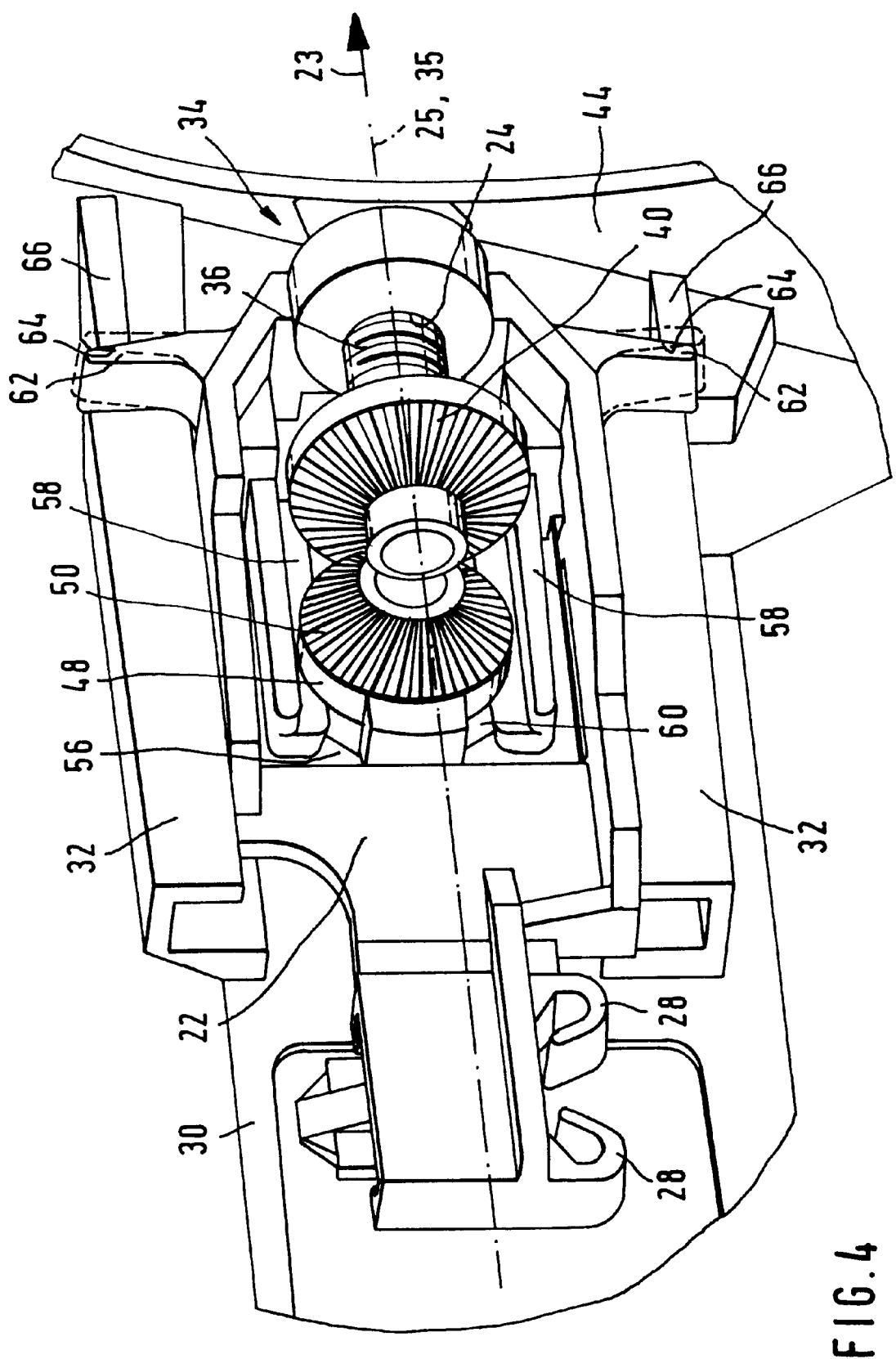
FIG. 4 is a perspective view of the adjusting device in accordance with the present invention.

FIGS. 2–4 show the adjusting device 18 in accordance with a first embodiment of the present invention. The adjusting device 18 has a transmission member 22 which is located inside the housing 10 and articulately connected with the reflector 12. The transmission element 22 is provided with a threaded opening 24 in its end region which faces away from the reflector 12. The transmission element 22 can be pivotably connected to the reflector 12, for example through a ball hinge. The transmission element 22 can be provided with a spherical trough 26 and several springy arms 28 in the end region facing the reflector 12, in which a not shown ball connected with the reflector 12 can be introduced. The transmission element in its central region between the threaded opening 24 and the spherical trough 26 has two lateral strips 29 which extend at least approximately parallel to the longitudinal axis 25 of the threaded opening 24. The transmission element 22 is formed preferably of one piece and is produced for example by injection molding from synthetic plastic. The housing 10 at an inner side has a wall 30 which extends near the transmission element 22. The wall is provided with two guiding members 32 which extend parallel to one another with a lateral distance from one another. They have an L-shaped cross-section. The transmission element 22 with its lateral strips 29 is insertable between the guiding members 32, so that its threaded opening 24 is displaceably guided between the guiding members 32 in the longitudinal direction of the longitudinal axis 25. However, it is not turnable around the longitudinal 25 of its threaded opening. The guiding members 32 are preferably formed of one piece with the wall 30 of the housing 10, which is produced for example by injection molding of synthetic plastic.

The adjusting device 18 also has an adjusting screw 34 which is arranged inside the housing 10. It has a shaft which is formed over a part of its longitudinal extension as its threaded pin 36. In the end region facing away from the reflector 12, the pin has a smooth portion 38 having a smaller diameter than the threaded pin 36. The smooth pin portion 38 can correspond for example to substantially the core diameter of the threaded pin 36 or a smaller diameter than it. At the side facing away from the smooth pin portion 38, on the threaded pin 36, the adjusting screw 34 has a bevel gear 40 with teeth facing away from the threaded pin 36 and facing toward the reflector 12. The adjusting screw 34 is supported with its smooth pin portion 38 in an opening 42, at the inner side of a wall 44 of the housing 10, displaceably around its longitudinal axis 35.

The wall 44 of the housing 10 can be for example a rear wall of the housing. The opening 42 can be formed for example as a blind hole, so that the rear wall 44 of the housing 10 does not have any throughgoing openings. The adjusting screw 34 is screwed with its threaded pin 34 into the threaded opening 24 of the transmission element 22. During its mounting, the adjusting screw 34 is plugged with its smooth pin portion 38 from the reflector 12 through the threaded opening 24 of the transmission element 22, and the smooth pin portion 38 is freely displaceable in the threaded opening 24 until the threaded shaft 36 is inserted in the threaded opening 24. After this, the transmission element 22 is connected through its threaded opening 24 with a threaded shaft 36 of the adjusting screw 34. During a turning of the adjusting screw 34 around its longitudinal axis 35, the transmission element 22 is moved in a longitudinal direction along the longitudinal axis 25 of the threaded opening 24 and the coaxial longitudinal axis 35 of the adjusting screw 34.

The wall 30 of the housing 10 in a region in which the bevel gear 40 of the adjusting screw 34 is arranged inside the housing 10, is provided with an opening 46. An actuating element 48 extends through the opening 46 from the outer side of the housing 10. It has an end extending into the housing 10 and is provided on this end with bevel teeth 50 engaging the bevel teeth of the bevel gear 40 of the adjusting screw 34. The actuating element 48 has a shaft 52 with which it is supported in the opening 46 of the housing 10. It also has a head 53 which comes to abutment against the outer side of the housing 10. An elastic sealing element 54 is clamped between the shaft 52 and the opening 46 for sealing the opening 46. The head 53 can have a depression in form of a slot, a cross slot, an inner hexagonal edge and the like, in which a corresponding tool can be inserted for turning the actuating element 48.

The transmission element 22 in the central region is provided with an opening 56 which longitudinally extend in its longitudinal movement direction, for the passage of the region of the actuating element 48 with the bevel teeth 50. The longitudinal extending opening 56 of the transmission element 22 is provided for permitting its movement in the longitudinal movement direction. The opening 56 of the transmission element 22 is limited laterally by two springy strips 58 which engage in a ring groove 60 of the shaft 52 of the actuating element 48 extending in the housing 10. Thereby the actuating element 48 is secured and can not be withdrawn from the opening 46. The actuating element 48 can be mounted in a simple way by inserting its bevel teeth 50 into the opening 46, so that the strips 58 of the transmission element 22 are springy pressed from one another until they can engage in the end position of the actuating element 48 into its ring groove 60.

In the end region which includes a threaded opening 24, two springy deformable ribs 62 extend outside of the guiding member 32 in the longitudinal direction of the transmission member 22 transversely to the longitudinal movement direction. The ribs 62 are preferably symmetrical to a central plane of the transmission element 22 which contains the longitudinal axis 25 of the threaded opening 24. They are arranged at a distance in a direction transverse to the longitudinal movement direction, to the strips 29 of the transmission element 22 arranged in the guiding members 22.

A step 64 is formed on both guiding members 32 of the wall 30 of the housing 10, at their legs which engage over the strips 29 of the transmission element 22. The step 64 faces toward the reflector 12. The steps 64 can be formed by webs 66 which are provided on the guiding members 32 and on the wall 30 or the rear wall 44 of the housing 10.

During a turning of the actuating element 48, the adjusting screw 34 is turned through its coupling via its bevel teeth 50 with the bevel gear 40, about its longitudinal axis 35. The adjusting screw is non-displaceably fixed in direction of its longitudinal axis 35 between the bottom of the blind hole 42 of the housing 10 and the bevel teeth 50 of the actuating element 48. The actuating element 48 forms thereby a holding element, with which the adjusting screw 34 is blocked in direction of its longitudinal axis 35. During the turning of the adjusting screw 34, the threaded pin 36 of the transmission element 22 which is screwed through it in the threaded opening 24 is displaced in its longitudinal movement direction in or opposite to the arrow direction 23. Depending on the turning of the actuating element 48 and the adjusting screw 34, the transmission element 22 is turned in the arrow direction 23 toward the rear wall 44 of the housing 10 or opposite to the arrow direction 23 from it and correspondingly the reflector 12 about the axis 20.

After a predetermined displacement of the transmission element 22 in the arrow direction 23 toward the rear wall 44 its ribs 62 abut against the step 64, while the threaded pin 36 of the adjusting screw 34 is still in engagement with the threaded opening 24 of the transmission element 22. During a further turning of the adjusting screw 34, the transmission element 22 is displaced further in the arrow direction 23 to the rear wall 44, and its ribs 62 is springy deformed. In FIGS. 3 and 4 the ribs 62 of the transmission element 22 are identified with broken lines in their not deformed position and with solid lines in their springy deformed position. After a predetermined further displacement path toward the rear wall 44, the threaded opening 24 disengages from the threaded pin 36 of the adjusting screw 34, since the threaded pin 36 ends and the smooth pin portion 38 is located in the threaded opening 24.

The adjusting screw 34 can be turned further in any manner, without performing a displacement of the transmission element 22 since its threaded connection with the adjusting screw 34 is eliminated. The springy deformed ribs 62 of the transmission element 22 produce a return force which acts on the transmission element 22 and loads it opposite to the arrow direction 23 from the rear wall 44, in the opposite longitudinal movement direction. With this return force, the transmission element 22 is held in a position, in which its threaded opening 24 abuts at the beginning against the threaded pin 36 of the adjusting screw 34. When the adjusting screw 34 starting from this position is turned in the opposite rotary direction, the threaded opening 24 in response to the return force of the ribs 62 again engages with the threaded pin 36 of the adjusting screw 34, and the transmission element 22 is displaced opposite to the arrow direction 23 from the rear wall 44. The arrangement of the threaded opening 24 of the ribs 62 on the transmission element 22, the arrangement of the step 64 on the housing 10, and the arrangement and the length of the threaded pin 34 of the adjusting screw 34 are selected in the longitudinal movement direction of the transmission element 22, so that as described above, the ribs 62 reach the abutment against the step 64 before the threaded pin 36 is at the end, and subsequently the threaded pin 36 has a length which makes possible the deformation of the ribs 62 for producing the return force.

FIG. 5 shows the adjusting device 18 in accordance with the second embodiment, in which the basic construction is similar to the construction of the first embodiment. Further ribs 72 are arranged on the transmission element 22. They are springly deformable or rigid. On the housing 10, for example on its guiding members 32, instead of the rigid web 66 with the step 64, ribs 74 which is springly deformable in the longitudinal direction of the transmission element 22 are provided. During the displacement of the transmission element 22 and the arrow direction 23 toward the rear wall 44 of the. housing 10, the ribs 72 of the transmission element 22 come to abutment against the ribs 74 of the housing 10. During a further displacement of the transmission element 22 to the rear wall 44 the ribs 72 and/or the ribs 74 of the housing 10 are springly deformed, and a return spring describes with respect to the first embodiment is produced to act on the transmission element 22 opposite to the arrow direction 23.

Figure 6:
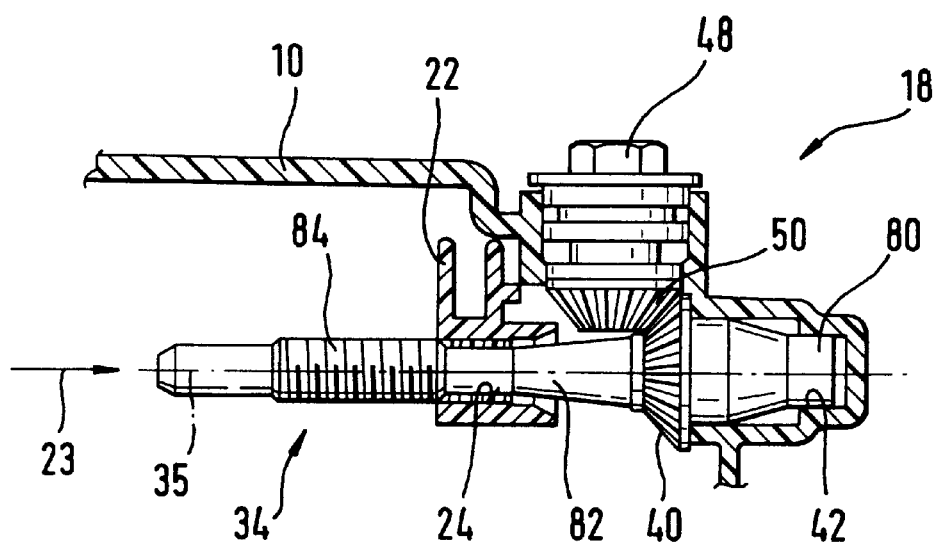
FIG. 6 is a view showing the adjusting device in a vertical longitudinal section, in accordance with a third embodiment of the present invention.

FIG. 6 shows the adjusting device 18 in accordance with a third embodiment of the present invention. The adjusting screw 34 has a pin 80, through which it is supported in the blind hole 42 of the housing 10 rotatably about its longitudinal axis 35. The bevel gear 40 is connected with pin 80, and a smooth pin portion 82 is connected with it, and finally a threaded pin 84 is connected with the pin portion. The transmission element 22 has a threaded opening 24, with which the threaded pin 84 is screwed. The actuating element 48 engages with its bevel teeth 50 in the bevel gear 40 and secures the adjusting screw 34 in the opening 42 of the housing 10 in direction of its longitudinal axis 35. The transmission element 22 and/or the housing 10, as in the first embodiment are formed so that before the transmission element 22 during its movement in the displacement direction 23 disengages from the threaded 84, a return force is produced to act on the transmission element 22 in the opposite displacement direction by abutment of the transmission element 22 against the housing 10 and a springy deformation of the transmission element 22 and/or the housing 10.

Figure 7:
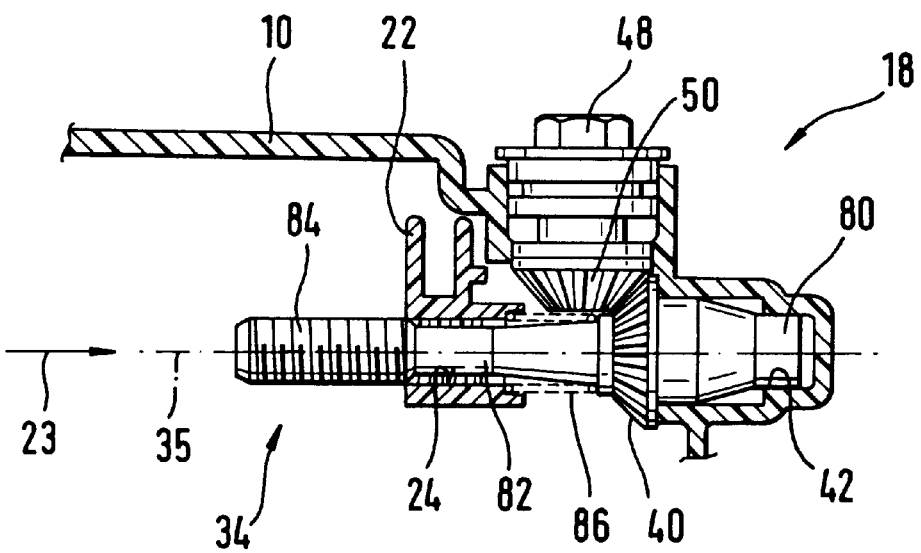
FIG. 7 is a view showing the adjusting device in the vertical longitudinal section, in accordance with a fourth embodiment of the present invention.

FIG. 7 shows the adjusting device 18 in accordance with a fourth embodiment of the present invention. The adjusting screw 34 has the pin 80, with which it is supported with the opening 42 of the housing 10 rotatably about its longitudinal axis 35. The bevel gear 40 is connected with the pin 80. The smooth portion 82 is connected with the bevel gear 40, and the threaded pin 84 of the adjusting screw 34 is connected with the pin portion. A transmission element 22 also has a threaded opening 24 screwed on the threaded pin 84. The actuating element 48 engages with its bevel teeth 50 in the bevel gear 40 of the adjusting screw 34 and secures it in direction of its longitudinal axis 35 in the opening 42 of the housing 10. A pressure spring 86 is arranged between the transmission element 22 and the adjusting screw 34. During the movement of the transmission element 22 in the displacement direction 23 before reaching of the smooth pin portion 82 it is prestressed when the transmission element 22. Thereby the return force is produced which acts on the transmission element 22 in the opposite displacement direction. The pressure spring 86 can be formed for example as a helical pressure spring which is arranged on the smooth pin portion 82. On the one hand, it abuts for example at the transition to the bevel gear 40 and on the other hand it abuts against the transmission element 22.

In all above described embodiments of the adjusting device 18, it is possible that its maximum displacement of the transmission element 22 from the rear wall 44 is limited alternatively or additionally in the same way as before, for the maximum displacement of the return wall 44.

It will be understood that each of the elements described above, or two or more together, may also find a useful application in other types of constructions differing from the types described above.

While the invention has been illustrated and described as embodied in a headlight fro a vechicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A headlight for a vehicle, comprising a holder; at least one reflector displaceably supported on said holder; an adjusting device for displacing said reflector, said adjusting device including an adjusting screw having a thread; a displaceably guided transmission element which is articulately connected with said reflector and with which said adjusting screw is connected, said adjusting screw being turnably supported about its longitudinal axis and during turning of said adjusting screw said transmission element is displaced in a longitudinal direction so as to displace reflector, said transmission element disengaging from said thread of said adjusting screw in said longitudinal direction after said transmission element has reached a predetermined maximum longitudinal displacement, said transmission element after a smaller displacement than said maximum displacement in a longitudinal displacement direction abutting against at least one abutment of a housing so that during a further movement of said transmission element in said longitudinal displacement direction until said transmission element disengages from said thread of said adjusting screw a return force is produced which loads said transmission element in an opposite longitudinal displacement direction.

2. A headlight as defined in claim 1, wherein said at least one abutment of said holder.

3. A headlight as defined in claim 1, wherein said at least one abutment of said transmission element is springy deformable, said at least one abutment is springy deformed until reaching of said maximum displacement path of said transmission element and producing said return force which acts on said transmission element in said opposite displacement direction.

4. A headlight as defined in claim 1, wherein said transmission element has at least one springy deformable portion which abuts against said at least one abutment, and is springy deformed until reaching of said maximum displacement path of said transmission element so as to produce said return force acting on said transmission element in said opposite displacement direction.

5. A headlight as defined in claim 4, wherein said at least one portion of said transmission element is formed as a rib which extends from said transmission element transversely to said displacement direction.

6. A headlight as defined in claim 4, wherein said transmission element has a second springy deformable portion, said portions of said transmission element being arranged at least approximately symmetrical to said longitudinal axis of said adjusting screw.

7. A headlight as defined in claim 1, wherein said holder has a guide for said transmission element, said at least one abutment being arranged on said guide.

8. A headlight for a vehicle, comprising a holder; at least one reflector displaceably supported on said holder; an adjusting device for displacing said reflector, said adjusting device including an adjusting screw having a thread; a displaceably guided transmission element which is articulately connected with said reflector and with which said adjusting screw is connected, said adjusting screw being turnably supported about its longitudinal axis and during turning of said adjusting screw said transmission element is displaced in a longitudinal direction so as to displace reflector, said transmission element disengaging from said thread of said adjusting screw in said longitudinal direction after said transmission element has reached a predetermined maximum longitudinal displacement, said transmission element after a smaller displacement than said maximum displacement in a longitudinal displacement direction abutting against at least one abutment of a housing so that during a further movement of said transmission element in said longitudinal displacement direction until said transmission element disengages from said thread of said adjusting screw a return force is produced which loads said transmission element in an opposite longitudinal displacement direction, said adjusting screw having a shaft provided with a threaded pin having said thread, a pin portion connected with said thread pin and having a smaller diameter than said thread pin, said transmission element having a threaded opening through which said shaft of said adjusting screw extends and in which said pin portion is arranged when said transmission element disengages from said thread of said adjusting screw.

9. A headlight for a vehicle, comprising a holder; at least one reflector displaceably supported on said holder; an adjusting device for displacing said reflector, said adjusting device including an adjusting screw having a thread; a displaceably guided transmission element which is articulately connected with said reflector and with which said adjusting screw is connected, said adjusting screw being turnably supported about its longitudinal axis and during turning of said adjusting screw said transmission element is displaced in a longitudinal direction so as to displace reflector, said transmission element disengaging from said thread of said adjusting screw in said longitudinal direction after said transmission element has reached a predetermined maximum longitudinal displacement, said transmission element after a smaller displacement than said maximum displacement in a longitudinal displacement direction abutting against at least one abutment of a housing so that during a further movement of said transmission element in said longitudinal displacement direction until said transmission element disengages from said thread of said adjusting screw a return force is produced which loads said transmission element in an opposite longitudinal displacement direction, said abutment being formed by a spring element which is arranged between said transmission element and another component of the headlight and is springy deformed until reaching of a maximum displacement path of said transmission element so as to produce said return force acting on said transmission element in said opposite displacement direction.

10. A headlight as defined in claim 9, wherein said component is said holder, so that said springy element is arranged between said transmission element and said holder.

11. A headlight as defined in claim 9, wherein said component is said adjusting screw so that said springy element is located between said transmission element and said adjusting screw.

12. A headlight as defined in claim 9, wherein said springy element is formed as a pressure spring arranged on said adjusting screw.

* * * * *